May 4, 1954  C. C. ROBINSON ET AL  2,677,758
ELECTRICAL TRACKING CIRCUIT
Filed Dec. 10, 1945  3 Sheets-Sheet 1

INVENTORS.
CARL C. ROBINSON
WILLIAM J. TULL
BY
William D. Hall
ATTORNEY

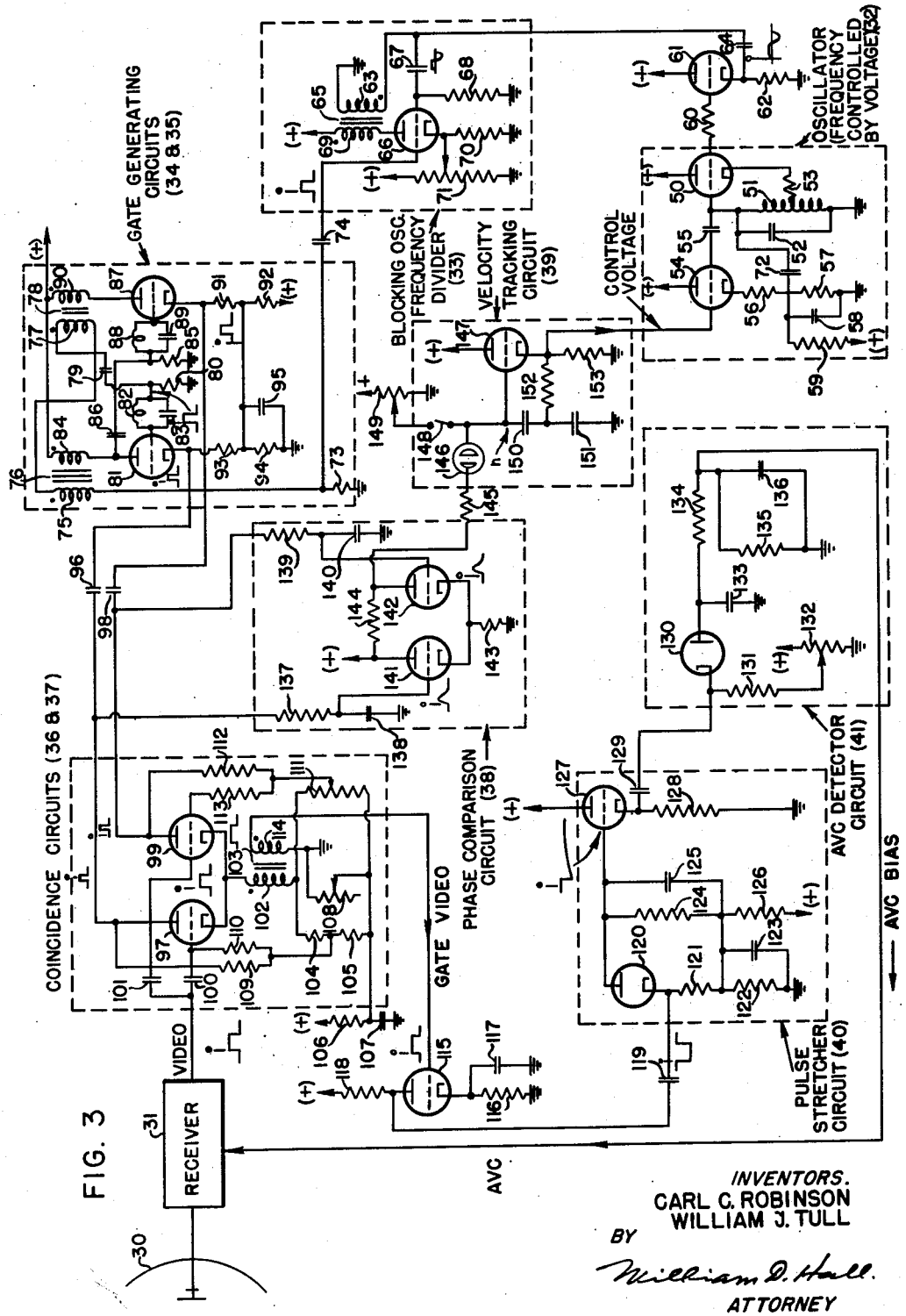

Patented May 4, 1954

2,677,758

UNITED STATES PATENT OFFICE 2,677,758

ELECTRICAL TRACKING CIRCUIT

Carl C. Robinson and William J. Tull, Cambridge, Mass., assignors, by mesne assignments, to the United States of America as represented by the Secretary of War Application December 10, 1945, Serial No. 634,075

6 Claims. (Cl. 250—20)

This invention relates in general to synchronized electrical circuits and more particularly to circuits which are utilized with so called automatic tracking apparatus.

One of the uses to which this invention may be put is in an automatic homing missile of the type described in an application of Britton Chance, et al., Serial No. 574,438, filed Jan. 18, 1945, and entitled "Method of and Means for Guiding Missiles." Such an automatic homing missile, which may be a glider, for instance, carries with it a complete radio echo detection receiver, the output from which is connected to control means for varying the motion of the object. The missile, which may be carried by a mother vehicle such for instance an airplane, to within a short distance of the target, or goal, is released at a convenient point. A radio pulse transmitter, which is carried in either the mother vehicle or the guided missile, is adapted to send out periodic pulses of extremely high frequency electromagnetic energy. A portion of the energy contained in these pulses is reflected from the target and is picked up by a directional antenna in the missile. The radio echo detection receiver develops the received energy into a video pulse. Automatic azimuth angle and elevation angle tracking circuits as described in the above-mentioned application by Chance, et al., and their associated controls keep the missile pointed towards the target on the average.

If the automatic tracking circuits are to use the information received to generate control voltages to keep the missile on a given target, however, some means must be employed to allow only the energy reflected from the desired target to pass through these circuits, to the exclusion of the energy which may be reflected from other objects in the nearby vicinity. Some of the previous circuits used to accomplish this result employed a precision delay multivibrator, which was synchronized (triggered) by the transmitted electromagnetic pulse from the mother vehicle. This circuit is described in the aforementioned application by Chance, et al. Automatic error detection and follow-up circuits then came into play which compared the trailing edge of the pulse from the delay multivibrator with the leading edge of the radio frequency pulse reflected from the target, and generated voltages which, when applied to the delay multivibrator, kept these two aforementioned pulse edges in coincidence on the average. The trailing edge of the delay multivibrator was made to trigger a pulse generating circuit, the output pulse from which is caused to turn on at least one normally-off vacuum tube in the receiver circuit, and so effectively to turn on the receiver itself. Thus only the originally selected echo pulse will be the one "tracked" by the circuits in the guided missile.

An important disadvantage in such an arrangement of synchronization is the need of a precision delay multivibrator. Such a circuit is very difficult to adjust and to keep in a consistently good operating state. Another disadvantage is in the use of the direct electromagnetic pulses from the mother vehicle as a synchronizing means. As the guided missile comes very close to the target, the pulses from the mother vehicle become small, especially when the guided missile employs only a single antenna, which, due to its directional properties may receive only a small amount of synchronizing pulse energy as compared to echo pulse energy. In this case, the automatic volume control associated with the circuits in the missile may virtually eliminate the former pulse energy. It is desirable, therefore, to have the synchronizing means wholly contained within the missile itself.

Among the objects of the present invention, therefore, are:

1. To provide an electrical pulse generator-receiver unit which is variable in time phase;

2. To provide means for synchronizing such a pulse generator-receiver unit with received pulses;

3. To provide such a synchronizing means which is dependent only upon the action of the pulse generator-receiver unit itself; and 4. To provide a pulse generating circuit which is particularly adaptable for use in automatic tracking devices.

In accordance with the present invention there is provided a radio-frequency electromagnetic pulse receiver and a controllable pulse generator for use in an automatic homing missile which is being directed toward a target illuminated by electromagnetic pulses from a transmitter in a mother vehicle. The phase of the local signals from the pulse generator is variable and associated automatic follow-up circuits continuously control the pulse generator so that the pulses therefrom will be substantially in time phase coincidence with the pulses reflected from the desired target and detected by the receiver.

In one embodiment of the circuit, synchronous voltage waves from a sine wave oscillator are fed to, and are caused to trigger, a first pulse generating circuit. The output from this first pulse generating circuit triggers a second pulse generating circuit. These two pulses, together with the received echo pulse, are coupled into two coincidence circuits. The outputs of the two coincidence circuits are fed into a phase comparison circuit, the output of which depends on the relative phases of the received pulses and the locally generated pulses. This output is made to control a slow sawtooth wave generating circuit, the output of which is fed back to the synchronous oscillator in such a manner as to cause the outputs from the two coincidence circuits to be equal. If the two locally generated pulses are substantially equal in length, and the received echo pulse has a length substantially twice that of one of the locally generated pulses, the leading edges of the pulse from the first pulse generating circuit will be substantially in time coincidence with the leading edge of the received echo pulse. The pulse outputs of the two coincidence circuits are time phase-abutted and a D.-C. voltage is developed from them by means of a pulse stretcher circuit, which has a very long time constant, in combination with a detector. This D.-C. voltage is used as a means of automatic volume control for the receiver.

In another embodiment the output from the pulse generator is fed directly to one coincidence circuit and to the other through a delay line which delays the pulse by an amount substantially equal to the width of the pulse. Hereafter the circuit is substantially the same as that of the first embodiment, except that the received echo pulse is coupled to the pulse stretcher together with a pulse taken from a mid-tap on the delay line.

This invention will best be understood by reference to the drawings, in which:

Fig. 3 is a detailed circuit diagram of the block diagram of Fig. 2; and

Figure 1:
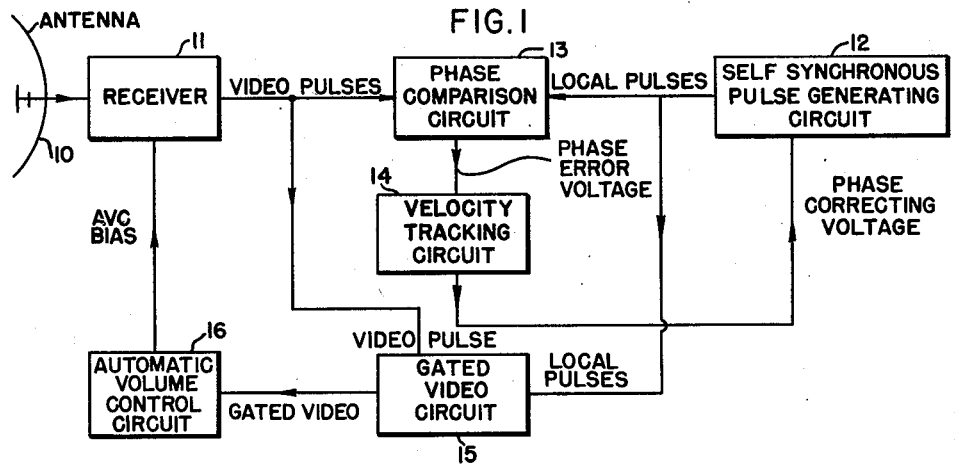
Fig. 1 is a block diagram of the general type of synchronized pulse generating circuit.

Referring now to a description of the general aspects of the invention, and to Fig. 1, the antenna 10 picks up electromagnetic pulse radiation which has been reflected from the desired target. This radio frequency pulse is amplified and detected by receiver 11, the output of which is a video pulse. The local pulse from a self-synchronous pulse generating circuit 12, together with the video pulse coming from the receiver 11, is coupled into a phase comparison circuit 13. The output of the phase comparison circuit 13, which depends upon the relative time phase of the video pulse and the corresponding local pulse, is sent to a sawtooth wave generating circuit 14, which provides a sawtooth wave with a very small slope. Due to the fact that the slope of the sawtooth wave is made to be dependent upon the velocity with which the missile containing this synchronizing apparatus approaches the target, this circuit 14 is called a velocity tracking circuit. The output from circuit 14 is fed to a point in the synchronous pulse generator 12 the variation of voltage at which will vary the time phase of the pulses therefrom.

Both the video pulse from the receiver and the local pulse are coupled into the gated video circuit 15, which provides an output only during the time when the two pulses overlap in time phase. The two pulses open and close circuit 15 analagously to the action of the opening and closing of a gate, hence the title "gated video" is applied. This gated video is fed to an automatic volume control circuit 16, which provides an output suitable for application to the receiver 11 as an automatic volume control (AVC) voltage. This voltage is usually applied to one or more of the receiver stages as a form of bias.

Figure 2:
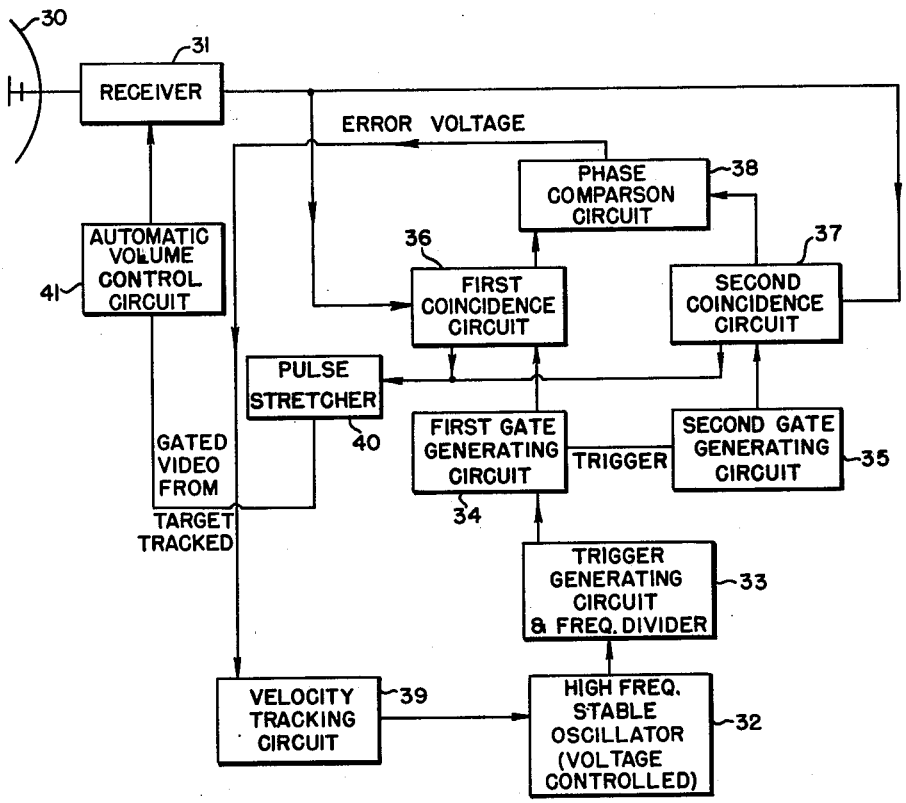
Fig. 2 is a block diagram of one embodiment of the general type of synchronized pulse generating circuit of Fig. 1.

Fig. 2 is a block diagram of a workable circuit employing the principles of the circuit of Fig. 1. The directional antenna 30 picks up a pulse of electromagnetic radiation that has been reflected from a desired target, and couples this radio frequency wave into a receiver 31. The output of receiver 31 is a video pulse. A high-frequency oscillator 32 generates a sinusoidal wave which is fed into a trigger generating circuit 33, which is also made to act as a frequency divider. The pulse from circuit 33 triggers a first gate generating circuit 34, the trailing edge of the substantially rectangular gate from which triggers another similar second gate generating circuit 35. The gates from circuits 34 and 35 are fed, together with the received video pulse, into coincidence circuits 36 and 37 respectively. These two gates are abutted in phase comparison circuit 38, the output from which depends upon the relative outputs from the two coincidence circuits. This output, or error voltage, is made to control the slope of the slow sawtooth wave output of the velocity tracking circuit 39. This sawtooth wave is coupled to the high frequency oscillator 32 as a controlling voltage.

The output from the first and second coincidence circuits 36 and 37 is also fed into a pulse stretcher circuit 40, having a long time constant network in its load circuit. This lengthened pulse from the pulse stretcher circuit 40 is coupled into an AVC circuit 41, which develops a D.-C. voltage adapted to be applied to the receiver 31 for bias purposes.

The complete circuit diagram of the synchronization circuit shown in Fig. 2 is given in Fig. 3. Individual circuits are labeled as to their function, and are numbered to correspond with the numbering given the same components in Fig. 2. Approximate voltage waveforms are drawn corresponding to the outputs of the various circuits.

The heart of the system is the sine wave oscillator 32, whose frequency is made to be dependent upon a certain control voltage coupled thereto. The elements associated with tube 50 form, together with the tube, a species of Hartley oscillator circuit. Between the grid of tube 50 and ground there is connected the tank circuit, consisting of coil 51 and condenser 52 in parallel. The cathode of tube 50 is connected to a tap on coil 51 through resistor 53, and the plate of this tube goes to a source of positive voltage. Tube 54 acts as a reactance tube, with the voltage on the grid of this tube determining the effective output reactance thereof. The grid of tube 54 is connected through condenser 55 to the grid of tube 50, to which is also connected the lower end of load resistor 56 through condenser 72. The cathode of tube 54 is connected to one end of resistor 56, the other end being connected to ground through the parallel network of resistor 57 and condenser 58. The top of this parallel network is brought to a source of positive potential through resistor 59.

The output from oscillator 32 is coupled from the grid of tube 50 through resistor 60 to the grid of cathode follower tube 61. The load resistor 62 of the cathode follower tube is connected between the cathode of this tube and ground, and the plate is returned to a positive voltage.

The varying voltage that appears across resistor 62 is coupled through condenser 64 to blocking oscillator 33 and to one end of the secondary winding 63 of pulse transformer 65. The other end of this winding is tied to ground. The free end of this winding is coupled to the grid of blocking oscillator tube 66 through condenser 67. This grid is returned to ground through grid leak resistor 68. The plate of this tube is connected to a source of positive potential through the primary winding 69 of pulse transformer 65, while the cathode of this tube is returned to ground through resistor 70. This cathode is tied to the center arm of potentiometer 71, which is connected between a source of positive potential and ground.

The output of the blocking oscillator 33 is taken from the grid of tube 66 and coupled by means of condenser 74 to resistor 73, which forms a part of the gate generating circuits 34 and 35. The top of resistor 73 is connected through the primary winding 75 of pulse transformer 76, through the primary winding 77 of pulse transformer 78 and through condenser 79 to one end of grid leak resistor 80, the other end of which is connected to ground. The voltage across this resistor is coupled to the grid of tube 81 through a parasitic suppressing network consisting of coil 82 and condenser 83 in parallel. The plate load circuit of tube 81 comprises the secondary winding 84 of pulse transformer 76, which is connected between the plate of this tube and a source of positive voltage. The varying voltage on the plate of tube 81 is coupled to grid leak resistor 85 through condenser 86. The voltage across this resistor is coupled to the grid of tube 87 through a parasitic suppressing network consisting of coil 88 and condenser 89 in parallel. In the plate circuit of tube 87 is the secondary winding 90 of transformer 78. The cathode load resistor 91 of tube 87 is connected from the cathode of tube 87 to the top of resistor 92, the other end of which is returned to a source of positive voltage. The cathode load resistor 93 of tube 94 is also connected from the cathode of the latter to the top of resistor 92. This point is returned to ground through a parallel network of resistor 94 and condenser 95.

The pulse outputs of gate generating circuits 34 and 35 are fed to coincidence circuits 36 and 37. The couplings are made from the cathode of tube 81 through condenser 96 to the plate of tube 97, and from the cathode of tube 87 through condenser 98 to the plate of tube 99.

Directional radio frequency antenna 30 is coupled to receiver 31, the video output of which is fed through condenser 100 to the grid of tube 97 and through condenser 101 to the grid of tube 99. The cathodes of tubes 97 and 99 are connected together and to one end of the primary winding 102 of pulse transformer 103. The other end of the primary winding of pulse transformer 103 is connected through series resistors 104 and 105 and through potentiometer 111 to one end of resistor 106, and to ground through condenser 107. The other end of resistor 106 is returned to a source of positive voltage. The point of connection of condenser 107 and resistor 106 is tied to ground through variable resistor 108. The plate of tube 97 is brought to the connecting point of resistors 104 and 105 through resistor 109. The grid leak resistor 110 returns the grid of tube 97 to the point between resistors 104 and 105. The plate of tube 99 is connected to the variable center arm of potentiometer 111 through resistor 112. The grid leak resistor 113 returns the grid of tube 99 to this center arm.

One end of the secondary winding 114 of pulse transformer 103 is tied to ground, and the other end goes to the grid of inverter tube 115. Between the cathode of tube 115 and ground is the parallel network of resistor 116 and condenser 117. The plate load resistor 118 is connected from the plate of this tube to a source of positive potential.

The output appearing at the plate of inverter tube 115 is fed through coupling condenser 119 to the cathode of diode 120, which forms a portion of the pulse stretcher circuit 40. Resistor 121 is connected from the cathode of tube 120 to the top of the parallel network of resistor 122 and condenser 123, the bottom of which is tied to ground. Across the series arrangement of diode 120 and resistor 121 is connected a large resistor 124 and a large condenser 125, in parallel. The lower connecting point of resistor 124 and condenser 125, as well as the top of resistor 122 and condenser 123, is tied to a source of positive potential through resistor 126. The plate of diode 120, the top of resistor 124 and the top of condenser 125 are connected to the grid of cathode follower tube 127. The plate of this tube is tied to a source of positive potential, and the cathode is connected to ground through load resistor 128.

The output of the pulse stretcher circuit 40 is coupled from the cathode of tube 127 through condenser 129 to the cathode of diode 130, the rectifying tube of AVC detector circuit 41. This cathode is biased positively by being tied through resistor 131 to the movable arm of potentiometer 132, which is connected between a source of positive potential and ground. The plate of tube 130 is connected to ground through condenser 133, and through resistor 134 to the top of the parallel network of resistor 135 and condenser 136, the bottom of which is tied to ground. The voltage across this parallel network is applied as bias directly to the grid-cathode circuit of one or more stages in receiver 31.

For frequency control purposes, a portion of the outputs from coincidence circuits 36 and 37 must be fed back to the oscillator 32. The first step in this process is the feeding of the outputs of the plates of tube 97 and 99 to the phase comparison circuit 38. The series circuit of resistor 137 and condenser 138 is connected between the plate of tube 97 and ground. The series circuit of resistor 139 and condenser 140 is connected between the plate of tube 99 and ground. The top of condenser 138 is tied directly to the grid of tube 141, and the top of condenser 140 is tied directly to the grid of tube 142. The cathodes of the two tubes are tied together and to ground through coupling resistor 143. The plate of tube 141 is tied to a source of positive potential, to which the plate of tube 142 is also connected through resistor 144.

The output of the phase comparison circuit 38, which is taken from the plate of tube 142, is coupled through the series combination of resistor 145 and gas tube 146 to the grid of tube 147 of the velocity tracking circuit 39. This grid can also be connected, by the closing of switch 148, to the movable arm of potentiometer 149, connected between a source of positive potential and ground. Between the grid of tube 147 and ground is connected a series circuit of condensers 150 and 151. The cathode of the tube is connected through resistor 152 to the connecting point of these two condensers. The plate of tube 147 is tied to a source of positive potential, and the cathode is returned to ground through load resistor 153. The output of the velocity tracking circuit 39, developed on the cathode of tube 147, is coupled directly to the grid of the reactance tube 54 of the oscillator 32.

Figure 4:
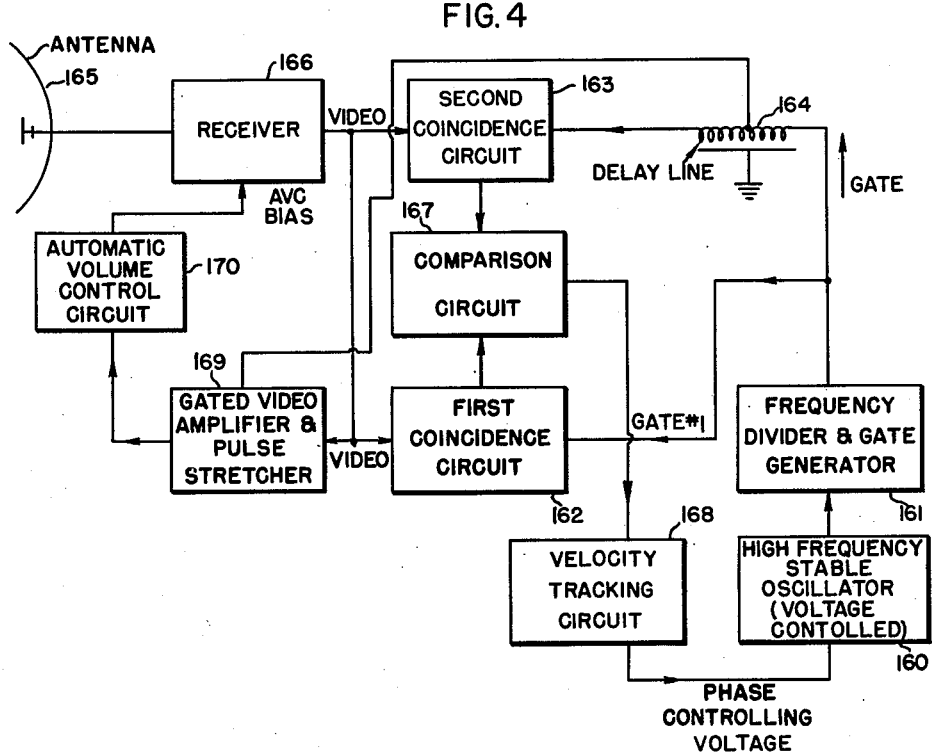
Fig. 4 is a block diagram of another embodiment of the general type of synchronized pulse generating circuit of Fig. 1.

Fig. 4 is a block diagram of another type of self-synchronization system which differs from the circuits of Figs. 2 and 3 mainly in the method of generating the two time abutted gates and in producing the gated video.

A high frequency stable oscillator 160 which may be voltage controlled has substantially the same operating frequency as the timing oscillator in the mother radio direction finding set. The output of this oscillator 160 feeds into a frequency divider and gate generator 161, the output from which is a series of rectangular pulses at a frequency which is a sub-multiple of the frequency of oscillator 160. These rectangular pulses are fed to a first coincidence circuit 162 directly, and to a second coincidence circuit 163 through a mid-tapped delay line 164, which has a time delay substantially equal to the width of the pulse generated by circuit 161. The echo pulses from the reflecting object used as a target are picked up by antenna 165 and coupled to receiver 166. The detected video pulse from the receiver is fed into both coincidence circuits.

For synchronization purposes, the outputs of the two coincidence circuits 162 and 163 are fed into the comparison circuit 167. The voltage from the comparison circuit is coupled to the velocity tracking circuit 168, which develops a controlling voltage which is applied to the oscillator 160.

The gate pulse from the mid-tap of the delay line 164, which straddles the two pulses applied to the two coincidence circuits, is fed to the gated video amplifier and pulse stretcher circuit 169, together with the video pulse from receiver 166. The output of this circuit, which is of an amplitude dependent upon the amplitude of the received pulses, is coupled to an automatic volume control circuit 170, which develops a D.-C. voltage suitable for biasing one or more stages of receiver 166.

Referring now to the operation of the various embodiments of the present invention and to Fig. 1, it is recalled that this figure shows a functional circuit only. The heart of the system is the free-running pulse generating circuit 12, which will oscillate at a frequency which is substantially equal to the frequency of the transmitted pulses from the mother radio direction finding transmitter. The time phase of the rectangular pulses generated by circuit 12 is variable by varying the amplitude of a control voltage fed thereto.

Both the pulse from circuit 12, which shall be called the local pulse, and the video echo pulse from the receiver 11 are fed into a phase comparison circuit 13, which produces an output voltage the amplitude of which is dependent upon the relative time phase difference of the local pulse and the echo pulse, and the polarity of the change in amplitude of which depends upon the polarity of the time phase of the local pulse with respect to the echo pulse. The velocity tracking circuit 14, which is controlled by the output voltage from the phase comparison circuit 13, produces a voltage which, when applied to the pulse generator 12, corrects the phase of the pulses generated thereby so that they will be substantially in time coincidence with the echo video pulses.

The gated video circuit 15 has fed to it constant amplitude local pulses and varying amplitude video pulses. Thus the output will be a pulse the amplitude of which is dependent upon the amplitude of the received echo pulse. This output is fed to a pulse stretcher circuit, called here the automatic volume control circuit 16, which produces a D.-C. voltage dependent upon the amplitude of the pulse from the gated video circuit 15. This automatic volume control (AVC) voltage is applied to a control electrode of the vacuum tube in one or more stages in the receiver 11 and is made to change the potential thereon in such a manner that an increased amplitude of echo pulse will result in a decrease in receiver gain.

Thus the automatic follow-up feature of the system continuously maintains timing coincidence between the local pulse and the echo video pulse. It will be noted that a number of signals appear at the output of the receiver, whereas in some types of automatic tracking circuits the receiver itself is gated at the time of reception of the desired pulse. The present system requires only that the local pulse be first set so that it is coincident with the echo video pulse, and then the only pulses which appear at the output of the gated video circuit are the desired ones. Thus only the desired pulses produce an AVC bias, and the gain of the receiver is controlled by these pulses.

Referring now to the detailed operation of one embodiment of the system of Fig. 1, and to Figs. 2 and 3, it will be noted that the individual circuits in Fig. 3 are numbered in accordance with the numbering given those same circuits in Fig. 2. The operation of the circuits of Fig. 3 will now be described more or less in detail. The sine wave oscillator 32 is of the modified Hartley type. Instead of the tank circuit, which consists of condenser 52 and coil 51, being connected between the grid of the tube 50 and plate through a blocking condenser, as is used extensively, it is seen that this tank circuit is connected between grid and ground. Resistor 53 in the cathode circuit of tube 50 provides an amount of negative feedback, since it is unbypassed, which adds to the stability of the oscillator.

Tube 54 is a reactance tube, the phase angle of the impedance between grid and ground of this tube being dependent upon the voltage on the grid of the tube. As this impedance is in parallel with the tank circuit in tube 50, the frequency of oscillation may be controlled by the voltage that is placed on the grid of tube 54.

The sine wave of voltage that is developed across the tank circuit of the Hartley oscillator is applied through a large series resistor 60 to the grid of cathode follower tube 61. The oscillations may be of a large enough amplitude so as to cause the grid of tube 61 to go more positive than the cathode during a portion of the cycle, thus allowing the grid to draw current, and clipping the top off the positive half cycle of the sine wave. The shape of the voltage output of the cathode follower appears at the cathode of the tube and has the waveform shown at that point, with zero time being arbitrarily chosen as the start of the positive half cycle of this wave.

The blocking oscillator 33 has a normally non-conducting tube by virtue of the positive voltage to which the cathode of tube 66 is connected. The incoming clipped sine wave raises the grid of tube 66 beyond cutoff and so initiates ordinary blocking oscillator action. A narrow rectangular pulse is generated by this circuit and immediately afterwards the grid is driven far below cutoff value so that several cycles of the wave from oscillator 32 will occur before the grid has risen to a value such that the tube may again be triggered. Thus the frequency dividing action of the circuit is obtained. The positive pulse which occurs on the grid of the tube 66 at substantially the arbitrarily chosen zero time is the output of this circuit.

Gate generating circuits 34 and 35 are essentially two normally non-conducting blocking oscillators, the trailing edge of the pulse generated by the first triggering the second. The positive pulse generated by blocking oscillator 33 appears across coupling resistor 73 and causes current to start flowing in the circuit consisting of the primary 75 of transformer 76, the primary 77 of transformer 78, condenser 79, and grid leak resistor 80. Since this current flows towards ground from the top of resistor 73, a positive pulse appears at the top of resistor 80. This raises the grid voltage of tube 81, which lowers the plate voltage. Because of the polarity with which transformer 76 is wound, it is seen that the voltage built up in coil 84 due to the lowering of this plate voltage, will be coupled to winding 75 in such a manner that it will strengthen the current flow already present in this element. This results in an increase in the grid voltage, and so ordinary blocking oscillator action ensues.

At the termination of the pulse generated by the blocking oscillator circuit of which tube 81 is a part, the plate of tube 81 rises very rapidly. This large rate of increase is coupled through condenser 86 to the grid of the second blocking oscillator tube 87. This increase in the grid voltage causes a lowering of the plate voltage and, due to the polarity with which transformer 78 is connected, the lower end of winding 77, which is the same as the upper end of winding 75 of transformer 76, is lowered, this causing an increase in voltage at the lower end of winding 84, thus raising the grid voltage of tube 87 still further. Conventional blocking oscillator action then takes place in the circuit of which tube 87 is a part. The positive pulse output of tube 81 appears across the cathode load resistance 93, which thus causes the output impedance of tube 81 to be low, such as is the case in a cathode follower type of circuit. The positive pulse output of tube 87, the leading edge of which is substantially in time coincidence with the trailing edge of the pulse output of tube 81, appears across cathode load resistance 91, thus also providing a low impedance output for this tube. The parallel network of condenser 83 and coil 82 and the network of condenser 89 and coil 88 are used for parasitic oscillation suppressing purposes.

The purpose of coincidence circuits 36 and 37 is twofold. One of their functions is to add the particular echo pulse desired coming from the receiver to the time phase abutted pulses generated by gate generating circuits 34 and 35 so that the resulting output pulse has an amplitude dependent upon the amplitude of the echo pulse. This resultant pulse is then used for AVC purposes. The other function is to add the echo pulse with one of the locally-generated gates in one tube, and to add the echo pulse with the other of the locally-generated gates in the other tube. It is seen that when the echo pulse "straddles" the two locally-generated pulses in time, the pulse energy in each of the newly-formed pulses will be equal. If the time width of each of the locally-generated pulses is made substantially equal to one-half of the time width of the echo pulse, this condition will cause the start of the leading edge of the sine wave from oscillator 32 to be in substantial time coincidence with the leading edge of the echo pulse.

The instantaneous voltage increases on the cathodes of tubes 81 and 87 supply instantaneous increases to the plate voltages of tubes 97 and 99 respectively. Quiescent low plate voltages are brought to these tubes through resistors 106, 105 and 109, and through resistors 106, 111, and 112, respectively. The detected echo pulse is fed to the grids of tubes 97 and 99. Since these two tubes are each coupled to transformer 103 in their cathode circuits, the pulse appearing on the secondary 114 of this transformer will be of a width that is twice the width of one of the gates from circuits 34 and 35. This pulse will be referred to as the gated video, because of the fact that it will only appear during that time when the detected pulse from the receiver 31 is in time phase coincidence with at least one of the pulses from gate generating circuits 34 and 35.

This gated video pulse is fed through tube 115 for inversion and amplification purposes and appears as a negative pulse on the cathode of diode 126.

Diode 126, triode 127, and some of the elements associated with these tubes acts as what is herein called a pulse stretcher circuit, because the circuit provides an output pulse which is of an appreciably longer duration than the input pulse. The purpose of obtaining a stretched output pulse will be understood if it is recalled that this gated video pulse will eventually be transformed into a D.-C. voltage useful for AVC purposes. Since the gated video pulse may have a duration in the order of a microsecond, it is seen that there is very little energy present to handle. This difficulty is overcome by forming a much longer pulse out of the gated video, but still retaining the characteristic that the amplitude is dependent upon the amplitude of the input echo pulse from the receiver.

In the pulse stretcher circuit 40, resistor 121 is a relatively small resistor, and resistor 124 is a relatively large resistor. The input gated video pulse lowers the cathode of diode 126, and so starts current flow therethrough. A very small portion of this current flows around through large resistor 124, but the majority of the current goes into the charging of condenser 125, this charge being such that the upper plate of this condenser is charged negatively. When the gated video pulse terminates, tube 126 turns itself off and condenser 125 starts discharging through large resistor 124. Since the discharge time of this condenser is very much longer than the charging time, the long pulse that appears at the grid of tube 127 is somewhat of the waveform shown above the block for the pulse stretcher circuit 40 in Fig. 3. Since tube 127 is a cathode follower, the output appearing at the cathode of this tube is of substantially the same amplitude and is of the same polarity as the input pulse.

The positive voltage fed to the grid of tube 127 through resistors 126 and 124 is for the purpose of setting the quiescent operating point of this tube.

The function of AVC detector circuit 41 is to provide a D.-C. voltage the amplitude of which is dependent upon the amplitude of the input pulse. When the cathode of tube 130 is brought to a lower potential than that of the plate, this tube starts conduction with the result that a negative D.-C. voltage appears at the upper end of resistor 135. This voltage may be applied to the grid circuit of one or more stages in the receiver 31 to provide a bias for AVC purposes.

Since the cathode of tube 130 is coupled through resistor 131 to a variable positive voltage, the input pulse must be of a large enough negative amplitude to overcome this constant voltage before the AVC bias voltage is generated. Thus a delayed AVC is provided.

As was stated above, another purpose of coincidence circuits 36 and 37 is to provide two pulse outputs, the time duration of each being dependent upon the effectiveness which the echo pulse straddles the particular locally-generated pulse. The pulse output of tube 81 is applied across the series circuit consisting of resistor 137 and condenser 138. The time constant of this circuit is much longer than the pulse duration, so there appears on the grid of tube 141 an integrated wave somewhat of the shape as sketched in Fig. 3. A similar wave appears on the grid of tube 142. These two waves will leave equal charges on condensers 138 and 140, on the average, if tubes 97 and 99 in coincidence circuits 36 and 37 conduct for equal periods of time. It will be recalled that these coincidence tubes conduct only when there is time coincidence between the pulses applied to the plates and the pulses applied to the grids.

It can be seen that tubes 141 and 142 and the associated circuits form a differential amplifier. It effectively compares the time phases of the two input pulses and raises or lowers the output voltage according as to whether the video echo pulse is allowing more of one locally-generated gate or more of the other to pass through the coincidence circuits.

The output of the phase comparison circuit 38 is fed from the plate of tube 142 through resistor 145 and gas tube 146 to the grid of tube 147. The purpose of the gas tube, which may be a small neon tube, is to render the circuit insensitive to very small changes in voltage at the plate of tube 142, and so to small oscillations, along the time axis, of the phase of the echo pulse with respect to the locally-generated gates.

The velocity tracking circuit 39 is a slow sawtooth wave generating circuit. The slope of the sawtooth wave appearing at the cathode of tube 147 is dependent upon the rate of discharge of condenser 151. This in turn is dependent upon the voltage drop across resistor 152, which is a comparatively large resistor. When the potential of the plate of tube 142 becomes, say, sufficiently larger than the potential on the grid of tube 147, the gas tube 146 will break down, increasing suddenly the voltages across condensers 150 and 151. This will increase the rate of discharge of condenser 151 and so increase the slope of the sawtooth wave on the cathode of tube 147.

Switch 148 is closed and potentiometer 149 is manipulated to bring the circuit into tracking coincidence with the target. It is seen that this is brought about by varying the potential at the grid of tube 147, and so varying the slope of the sawtooth wave generated by circuit 39. This system will "lock" in with the echo pulse because of the small difference in frequency that will exist between the echo pulse repetition frequency and the pulse repetition frequency from circuit 33.

Since tube 54 is a reactance tube, the varying voltage on its grid will result in a varying output reactance. Since this output reactance is in parallel with the resonant circuit in association with tube 50, as the voltage on the grid of tube 54 varies, the output frequency of oscillator 52 varies accordingly. This varying frequency results in an effective varying phase of the oscillator output, so that the output is moved along the time axis in order to tend to remain in coincidence with the echo pulse from the moving target. This resultant phase change has an amplitude which is the quotient of the difference between the center frequency and the instantaneous frequency and the rate of change of frequency.

It is common practice to employ not one blocking oscillator frequency divider, but several, one feeding into the other. This assures the stability of the circuits. When too high a frequency division is attempted in any one circuit, this type of circuit may jump from one frequency division ratio to an adjacent ratio, thus completely destroyng the synchronism of the system.

The purpose of using a frequency divider, rather than using an oscillator of a lower frequency output, is for increased frequency stability. The overall result is in decreasing the jitter in the spacing of the pulses generated by blocking oscillator 33.

An alternative circuit for obtaining the tracking desired is shown in block diagram form in Fig. 4. The way in which the circuit differs from the arrangement shown in Figs. 2 and 3 is in the manner of obtaining the two time-abutted gates. Instead of employing two triggered blocking oscillators, this circuit uses a mid-tapped delay line. The delay of the line is substantially equal to the time width of the gate from the frequency divider circuit 161.

In the circuit of Fig. 4, as in the circuit of Figs. 2 and 3, a high frequency stable oscillator 160 is used to control the timing of the system. Frequency divider 161 converts the sine wave output of oscillator 160 at a frequency F into a substantially rectangular gate of frequency F/N, where N is the frequency ratio of the circuit.

This gate is applied directly to the first coincidence circuit 162 and through the delay line 164 to the second coincidence circuit 163. Thus a gate will emerge from the second coincidence circuit delayed from the gate emerging from the first coincidence circuit a time approximately equal to the width of the gate. The two gates will therefore be time-abutted.

These two gates are then compared as to phase in a comparison circuit 167, which may be similar to the comparison circuit of Fig. 3, so that the output will control the velocity tracking circuit which in turn adjusts the phase or frequency of the oscillator so as to maintain coincidence between the echo signal and the mid-position of the two gates.

The delay line is mid-tapped to provide a gate which straddles the echo pulse. The video pulse from the receiver, together with the pulse from the mid-tap of the delay line, are fed to the gated video circuit 169. This circuit provides a pulse which is of an amplitude dependent upon the amplitude of the video echo pulse. It lengthens this pulse and feeds it into the AVC circuit 170, which provides a D.-C. voltage for receiver bias purposes.

In general, it will be seen that automatic following of the desired echo pulse will be obtained by the present circuit without the conventional gating of the receiver. Since a number of echo pulses may appear at the output to the receiver, the pulse output from the pulse stretcher circuit 40 or 169 is one which may be utilized for the controlling of the movements of the guided missile.

The advantages of the circuit of this invention over the type of automatic tracking apparatus described in the above-mentioned application of Chance, et al., are (1) more reliable synchronization, and (2) increased anti-jamming properties. By jamming is meant the transmitting of false electromagnetic information towards the missile containing the automatic tracking circuit in such a manner that the circuit will respond to these false signals rather than to the desired signals. When this occurs the missile will, of course, not travel in the desired path and its effect will be nullified.

The only way in which the present apparatus could be jammed is to use a transmitted jamming pulse of substantially the same carrier frequency as that to which the receiver is tuned. This pulse must have a repetition rate equal to that of the rate at which pulses are generated in the gate generating circuits in Figs. 2, 3, and 4, and, in addition, must be phased to the position of the locally generated pulse. If these jamming signals were stronger than the echo pulses, and the previous conditions were fulfilled, then the jamming pulse must be moved away slowly in phase, with respect to the echo pulses, so as to get the locally generated gate to track away from the echo. This is clearly a difficult thing to do.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a pulse echo detection system adapted to be located on a craft moving with respect to a selected object, an apparatus on said craft for generating local pulses which occur in time coincidence with echo pulses received from said selected object; said apparatus comprising receiving means for receiving reflected echo pulses of transmitted exploratory pulses, each of said echo pulses having a given duration, a first pulse generating circuit for generating a series of first local pulses having a repetition rate dependent upon the magnitude of a direct current voltage applied thereto, each of said first local pulses having one-half said given duration, a second pulse generating circuit coupled to said first pulse generating circuit for generating in response to each first local pulse a second local pulse having one-half said given duration and having its leading edge in time coincidence with the lagging edge of said first local pulse, means for initially applying to said pulse generating circuit a first direct current voltage of a magnitude to bring the leading edge of a first local pulse into time coincidence with the leading edge of an echo pulse from selected object, means for generating a second direct current voltage the magnitude of which varies with time in a given direction from a magnitude proportional to the amplitude of each of a series of voltage pulses applied thereto, means for removing said first voltage from said pulse generating circuit and applying said second voltage thereto when the leading edge of said first local pulse is brought into time coincidence with the leading edge of said echo pulse from said selected object, a first coincidence circuit having said first local pulses and said echo pulses applied thereto for obtaining an output having an amplitude proportional to the time interval a first local pulse overlaps an echo pulse, a second coincidence circuit having said second local pulses and said echo pulses applied thereto for obtaining an output proportional to the time interval a second local pulse overlaps an echo pulse, comparison means connected to said first and second coincidence circuits for providing an output proportional to the algebraic difference in the outputs of said first and second coincidence circuits to thereby produce a series of voltage pulses, and means for applying said series of voltage pulses to said means for generating said second direct current voltage.

2. An apparatus according to claim 1, wherein said first pulse generating circuit comprises a sine-wave oscillator producing oscillations having a high frequency relative to the repetition rate of said echo pulses, a reactance tube coupled to said oscillator for controlling the frequency of said oscillations in accordance with the magnitude of a direct current voltage applied to the input thereof, a blocking oscillator, means for synchronizing said blocking oscillator with said oscillations to produce trigger pulses having a repetition rate which is a given submultiple of the freqency of said oscillators and which is in the vicinity of the repetition rate of said echo pulses, and a first gate generating circuit coupled to said blocking oscillator for producing first gate pulses having the leading edges thereof in time coincidence with said trigger pulses and having a duration equal to one-half said given duration, whereby said first local pulses comprise said first gate pulses; and wherein said second pulse generating circuit comprises a second gate generating circuit coupled to said first gating circuit for producing second gate pulses having the leading edges thereof in time coincidence with the lagging edges of said first gate pulses and having a duration equal to one-half said given duration.

3. An apparatus in accordance with claim 2, wherein said means for generating said second direct current voltage comprises a serially connected capacitance and resistance having a long time constant relative to the repetition rate of said echo pulses, means for directly charging said capacitance with said voltage pulses, said capacitance discharging through said resistance during the interval between voltage pulses, and means for applying the voltage across said serially connected capacitance and resistance to the input of said reactance tube.

4. An apparatus in accordance with claim 3, wherein the outputs of said first and second coincidence circuits are also proportional to the amplitude of said echo pulses from said selected objects; and further comprising a pulse stretcher including an integrating circuit, means for applying the outputs from both said first and second coincidence circuits to said pulse stretcher, an automatic volume control circuit connected to said pulse stretcher for producing a gain control voltage proportional to the average output of said pulse stretcher and means for applying said gain control voltage to said receiving means to control the gain thereof.

5. An apparatus according to claim 1, wherein said first pulse generating circuit comprises a sinewave oscillator producing oscillations having a high frequency relative to the repetition rate of said echo pulses, a reactance tube coupled to said oscillator for controlling the frequency of the oscillations in accordance with the magnitude of a direct current voltage applied to the input thereof, a blocking oscillator, means for synchronizing said blocking oscillator with said oscillations to produce trigger pulses having a repetition rate which is a given submultiple of the frequency of said oscillations and which is in the vicinity of the repetition rate of said echo pulses, and a gate generating circuit for producing first gate pulses having the leading edges thereof in time coincidence with said trigger pulses and having a duration equal to one-half said given duration, whereby said first gate pulses comprise said local pulses; and wherein said second pulse generating circuit comprises a delay line providing a delay equal to one-half said given duration, means for applying said first gate pulses to the input of said delay line to produce second gate pulses at the output of said delay line, whereby the leading edges of said second gate pulses are in time coincidence with the lagging edges of said first gate pulses.

6. An apparatus according to claim 5, further comprising means for deriving third gate pulses at the midpoint of said delay line, the leading edge of each of said third gate pulse being half way between the leading and lagging edges of each of said first gate pulses and the lagging edge of each of said third gate pulses being half way between the leading and lagging edges of each of said second gate pulses, a video amplifier means, means for applying echo pulses from said receiver as an input to said video amplifier means, means for gating said video amplifying means with said third gate pulses, whereby said video amplifying means has an output only during the presence of said third gate pulse and which has a magnitude proportional to the amplitude of the echo pulses from said selected object, automatic volume control means connected to said video amplifier means for producing a gain control voltage proportional to the average output of said video amplifier means, and means for applying said gain control voltage to said receiving means to control the gain thereof.

References Cited in the file of this patent

UNITED STATES PATENTS

| Number | Name | Date |
|---|---|---|
| 2,250,284 | Wendt | July 22, 1941 |
| 2,403,975 | Graham | July 16, 1946 |
| 2,408,821 | Stearns | Oct. 8, 1946 |
| 2,430,570 | Hulst et al. | Nov. 11, 1947 |
| 2,451,632 | Oliver | Oct. 19, 1948 |
| 2,455,265 | Norgaard | Nov. 30, 1948 |
| 2,460,112 | Wright et al. | Jan. 25, 1949 |
| 2,495,753 | Mozley | Jan. 31, 1950 |
| 2,512,923 | Dippy | June 27, 1950 |
| 2,516,356 | Tull et al. | July 25, 1950 |
| 2,534,862 | Fox | Dec. 19, 1950 |
| 2,543,072 | Stearns | Feb. 27, 1951 |